US012410656B2

(12) United States Patent
Dück

(10) Patent No.: US 12,410,656 B2
(45) Date of Patent: Sep. 9, 2025

(54) QUICK-ACTION ROLL-UP DOOR

(71) Applicant: Frinova GmbH, Pansdorf (DE)

(72) Inventor: Wilhelm Dück, Lübeck (DE)

(73) Assignee: FRINOVA GMBH, Pansdorf (DE)

( * ) Notice: Subject to any disclaimer, the term of this patent is extended or adjusted under 35 U.S.C. 154(b) by 395 days.

(21) Appl. No.: 17/863,573

(22) Filed: Jul. 13, 2022

(65) Prior Publication Data

US 2023/0105435 A1 Apr. 6, 2023

(30) Foreign Application Priority Data

Jul. 14, 2021 (EP) .................................... 21185668
Jun. 9, 2022 (EP) .................................... 22178193

(51) Int. Cl.
*E06B 9/171* (2006.01)
*E06B 9/13* (2006.01)
*E06B 9/17* (2006.01)
*E06B 9/78* (2006.01)

(52) U.S. Cl.
CPC ................ *E06B 9/171* (2013.01); *E06B 9/13* (2013.01); *E06B 9/17076* (2013.01); *E06B 9/78* (2013.01)

(58) Field of Classification Search
CPC .. E06B 9/13; E06B 2009/135; E06B 9/17076; E06B 2009/17069; E06B 9/581; E06B 9/582; E06B 9/58; E06B 2009/588
See application file for complete search history.

(56) References Cited

U.S. PATENT DOCUMENTS 5,752,558 A * 5/1998 Lin ......................... E06B 9/326 160/320
2004/0206462 A1* 10/2004 Fitzgerald ................. E06B 9/13 160/231.1
2014/0246157 A1* 9/2014 Letonje ..................... E06B 9/58 160/188
2015/0096696 A1* 4/2015 Sentjurc .................... E06B 9/13 160/309
2016/0115731 A1* 4/2016 Pfaff ......................... E06B 9/58 160/271

(Continued)

FOREIGN PATENT DOCUMENTS

EP 2031178 A1 3/2009
EP 3763911 A1 1/2021

(Continued)

*Primary Examiner* — Daniel P Cahn
*Assistant Examiner* — Matthew R. Shepherd
(74) *Attorney, Agent, or Firm* — McGlew and Tuttle, P.C.

(57) ABSTRACT

A quick-action roll-up door (1) for a cold storage room has a flexible door panel (5), which is windable onto a horizontal shaft (4) in a vertical running direction for purposes of closing a door opening (2) bounded by a door frame (3). A winding drive (6) opens and closes the door, together with a pressure application frame (8), subjecting the door panel in a closing position to force, transverse to a planar face of the door panel, in the direction of the door frame. Furthermore, device features are provided, which apply force to the pressure application frame in the direction of the door frame when the roll-up door is closed, and relieve it when it is opened. The device features have a traction drive (14), which is functionally connected to the winding drive for the door panel, and which controls the movement of the pressure application frame.

25 Claims, 5 Drawing Sheets

(56) References Cited

U.S. PATENT DOCUMENTS

| | | | | |
|---|---|---|---|---|
| 2018/0016841 | A1 * | 1/2018 | Dück | E06B 9/58 |
| 2019/0143797 | A1 * | 5/2019 | Gupta | B60J 5/062 296/190.11 |
| 2021/0372198 | A1 * | 12/2021 | Duck | E06B 9/13 |

FOREIGN PATENT DOCUMENTS

| | | | | |
|---|---|---|---|---|
| EP | 3919715 | A1 | 12/2021 | |
| KR | 102199952 | B1 | 1/2021 | |
| NL | 1025507 | C2 * | 8/2005 | E06B 9/13 |
| WO | 2013167379 | A1 | 11/2013 | |

* cited by examiner

QUICK-ACTION ROLL-UP DOOR

CROSS REFERENCE TO RELATED APPLICATIONS

This application claims the benefit of priority under 35 U.S.C. § 119 of European Applications 21 185 668.7, filed Jul. 14, 2021 and 22 178 193.3, filed Jun. 9, 2022, the entire contents of which are incorporated herein by reference.

TECHNICAL FIELD

The invention relates to a quick-action roll-up door, in particular a quick-action roll-up door for a cold storage room, with a flexible door panel, which can be wound onto a horizontal shaft, and has a vertical running direction for purposes of closing a door opening bounded by a door frame. The roll-up door has a winding drive for purposes of opening and closing the door, together with a pressure application frame, with which the door panel, in its closing position, can be subjected to force, transverse to its planar face, in the direction of the door frame, in order to ensure that the door panel bears against the door frame to provide a best possible seal. For this purpose, means are provided, which, when the roll-up door is closed, apply force to the pressure application frame in the direction of the door frame.

BACKGROUND

Such quick-action roll-up doors are amongst the state of the art, and have proved their worth, since they open and close comparatively quickly on the one hand, and on the other hand in the closed state they close the door opening in a largely sealed manner. The door panel, which is made up of various components, is self-contained, comparatively light and elastically flexible, so that it can be transformed from its flat shape, which closes the door opening, into a wound-on shape, that is to say, it forms a door panel winding.

Since the door panel is self-contained but elastically flexible, it is advisable to guide it, at least in its vertical edge regions. This can be done between the door frame on the one hand and a pressure application frame on the other hand and, if necessary, further guides, wherein the pressure application frame possesses a guiding function during opening and closing and, in the closed position, serves to press the door panel against the door frame or its guide to provide a best possible seal with the application of force. For this purpose, it is of known art to provide a particular pressure application mechanism, with which the door panel, in its closed position, is pressed by the pressure application frame against the door frame to provide a seal, and which, for purposes of opening the roll-up door, spaces these components apart from each other so that the door panel can be opened and wound on with as little friction as possible.

Such a quick-action roll-up door is amongst the state of the art, and is of known art from EP 3 919 715 A1. In this quick-action roll-up door of known art, the pressure application frame is held at a distance by spring force, and is only force-actuated in the closed position by means of a separate drive. For this purpose, spindle drives are provided between the door frame and the pressure application frame, which are functionally connected (operatively connected) to each other by means of a circulating traction means (circulating traction elements), and are driven synchronously by a separate drive unit.

The disadvantage of this mechanism is that an exact adjustment between the drives is required to ensure, on the one hand, a sealed fit of the door panel in the closed position, and, on the other hand, a rapid lifting of the pressure application frame for purposes of opening the door panel. The construction is also technically complex and therefore expensive.

SUMMARY

Against this background, an object of the invention is that of improving a quick-action roll-up door of the type cited above, in particular so as to reduce the above-cited disadvantages.

In accordance with the invention this object is achieved by a quick-action roll-up door with the features according to the invention. Advantageous configurations of the invention ensue from this disclosure including the claims, the following description and the drawings.

The quick-action roll-up door in accordance with the invention, which is advantageously configured and deployed as a quick-action roll-up door for a cold storage room, has a flexible door panel, which can be wound onto a horizontal shaft, and has a vertical running direction for purposes of closing a door opening bounded by a door frame. For purposes of opening and closing the door, a winding drive is provided, together with a pressure application frame, with which the door panel in its closing position can be subjected to force, transverse to the planar face of the door panel, in the direction of the door frame. A force application means is provided, which, when the roll-up door is closed, applies force to the pressure application frame in the direction of the door frame. In accordance with the invention, this force application means comprises a traction drive, which is functionally connected (operatively connected) to the winding drive for the door panel, and which controls the movement of the pressure application frame.

A basic concept of the solution in accordance with the invention is to combine the drive of the drive frame with the winding drive, which is necessary anyway, in order to save on a separate drive for the drive frame on the one hand, and on the other hand to ensure, through the coupling of the drives, that the application of pressure by the pressure application frame, or the opening of the pressure application frame, only takes place in the closed position, that is to say, when the door panel completely, or almost completely, closes the door opening. Thus, in accordance with the invention, a traction drive is provided, which is functionally connected to the winding drive, and which controls the movement of the pressure application frame.

It is advisable to move the pressure application frame in one direction by spring force (by a spring means—a spring arrangement comprising one or more spring), and in the other direction by the traction drive, which must also overcome the spring force. In principle, it does not matter whether the traction drive is effective in the pressure application direction of the pressure application frame, or in the opposite direction. However, it is particularly advantageous if the spring force is only used to release the pressure application frame, and the traction drive is used to apply pressure, as then a comparatively high pressure application force can be applied, since the spring means (spring arrangement) only has to apply the restoring forces to open the pressure application frame. In principle, the traction drive can also be configured in such a way that it moves the pressure application frame both in the pressure application direction and in the opposite direction.

It has proven to be particularly advantageous to deflect the pressure application frame at floor level, wherein, for purposes of opening the pressure application frame, the deflection can be generated by the force of the spring means (spring arrangement). Advantageously, these are supported by a deflection roller mounted at the top of the pressure application frame, which is arranged below the winder for the door panel, in such a way that a force is generated in the opening direction of the pressure application frame during the winding-on procedure. Such an arrangement is particularly advantageous if the pressure application frame is deflected at floor level, since the deflection force then generates a large moment in the opening direction of the pressure application frame.

For the purposes of the present invention, a pressure application frame does not necessarily mean a closed frame, but rather two vertical sections are sufficient, which press the vertically running longitudinal sides of the door panel against the door frame to provide a seal. It is to be understood that these vertical pressure application elements can be connected to each other by an upper and/or lower transverse connection to form a partially closed, or closed, pressure application frame.

In the context of the present invention a door frame does not necessarily have to be understood to be a frame enclosing the door opening, as is typically the case, for example, with roll-up doors for cold storage rooms. In the context of the present invention a door frame is the region surrounding the door opening which, in contrast to the door panel, is in a fixed position and immovable.

It is particularly advantageous if the pressure application frame is force-loaded by the spring means (spring arrangement) into a position spaced apart from the door panel; the traction drive then only has to be configured and determined for the pressure application movement of the pressure application frame, which simplifies the construction of the latter.

In accordance with a development of the invention, it is advantageous if the traction drive is formed by two circulating traction means (traction elements), which are arranged vertically, and in the region in front of the vertical parts of the pressure application frame; in each case these are driven and controlled by a drive gear seated on the horizontal shaft of the winding drive. Such an arrangement is advantageous not only, but in particular, in the case of an open pressure application frame, which has no transverse connection. However, such an arrangement has also proved itself with a closed, or partially closed, pressure application frame, since it enables a very direct drive of the control means for the pressure application frame on both sides, can easily be adjusted, and is not very susceptible to faults.

Advantageously, the pressure application frame can be formed by two vertical pressure application elements, which can preferably be moved independently of each other. In accordance with a preferred configuration of the invention, however, the pressure application frame is configured as a closed, or partially closed, frame, which preferably has an upper horizontal crossbeam, via which the vertical pressure application elements are connected, and which also provides a horizontal seal by pressing the door panel against the upper face of the door frame. For this purpose, a transverse roller can advantageously be provided on the upper face of the pressure application frame, which causes a deflection of the door panel from the side close to the frame towards the door panel winding, that is to say, in the direction of the winding-on shaft. When the winding-on drive is under tensile load, this roller automatically ensures that the pressure application frame is spaced apart from the door frame by the drive force of the winding drive.

Advantageously, at least one controlling body is attached to each traction element, and it is particularly advantageous if a plurality of controlling bodies are attached to each traction element, since this enables a very uniform introduction of the contact pressure onto the pressure application frame, and thus also onto the door panel.

In order to be able to apply the required contact pressure reliably, it is advantageous to provide a supporting body for each controlling body, which is arranged in a fixed position on the door frame, or on a component connected to the latter, and which applies the necessary support force in order that the force of the traction drive acting in the vertical direction can be converted by the controlling body into a pressure application force transverse to it.

For this conversion, a controlling body is advantageously configured in such a way that it has a wedge-shaped tip, or is wedge-shaped, wherein the tip is advantageously directed downwards. The controlling bodies can then be attached to the traction elements and moved together with the latter in the same direction as the door panel, so as to apply the pressure application forces to the pressure application frame in the closed position of the door panel. In principle, the controlling bodies can also operate in the opposite direction, that is to say, in the upward direction, but the downward direction is preferred, in particular because it simplifies adjustment.

The controlling bodies are advantageously arranged such that they can be moved along a vertical pressure application element, so that a pressure application force is generated when the control element passes between the pressure application element and a supporting body. With such an arrangement, a direct application of force is possible, in practice without the use of levers and moments, which is very effective and not very susceptible to faults.

In order to achieve a pressure application force of the pressure application frame on the door panel that is as uniform as possible, it is particularly advantageous if two or more controlling bodies, arranged in a distributed manner over the vertical length, are provided on each traction element; in each case these apply a pressure application force in conjunction with a supporting body arranged on the door frame.

The traction drive, or drives, can be formed by a chain drive, but the use of toothed belts as traction drives has proved to be particularly advantageous, as these are light, require little maintenance, run dry, and also enable a low-noise operation. There is also no need for a complex safety casing for the traction drive.

Since the traction elements are advantageously driven in each case by a spur gear arranged on the winding-on shaft next to the door panel winding, it is advantageous to provide a lower deflection roller for each traction element, with which the deflection takes place, and the necessary stress is applied to the traction drive. Such a deflection roller is therefore advantageously spring-loaded downwards in the direction of force, and is mounted on the door frame so that it can move to a limited extent. It is advisable to arrange the traction drives with the controlling bodies in such a way that they are arranged in front of the vertical pressure application elements of the pressure application frame (as viewed onto the door from the front).

The invention is explained in more detail below with reference to an example of embodiment illustrated in the drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF PREFERRED EMBODIMENTS

Figure 1:
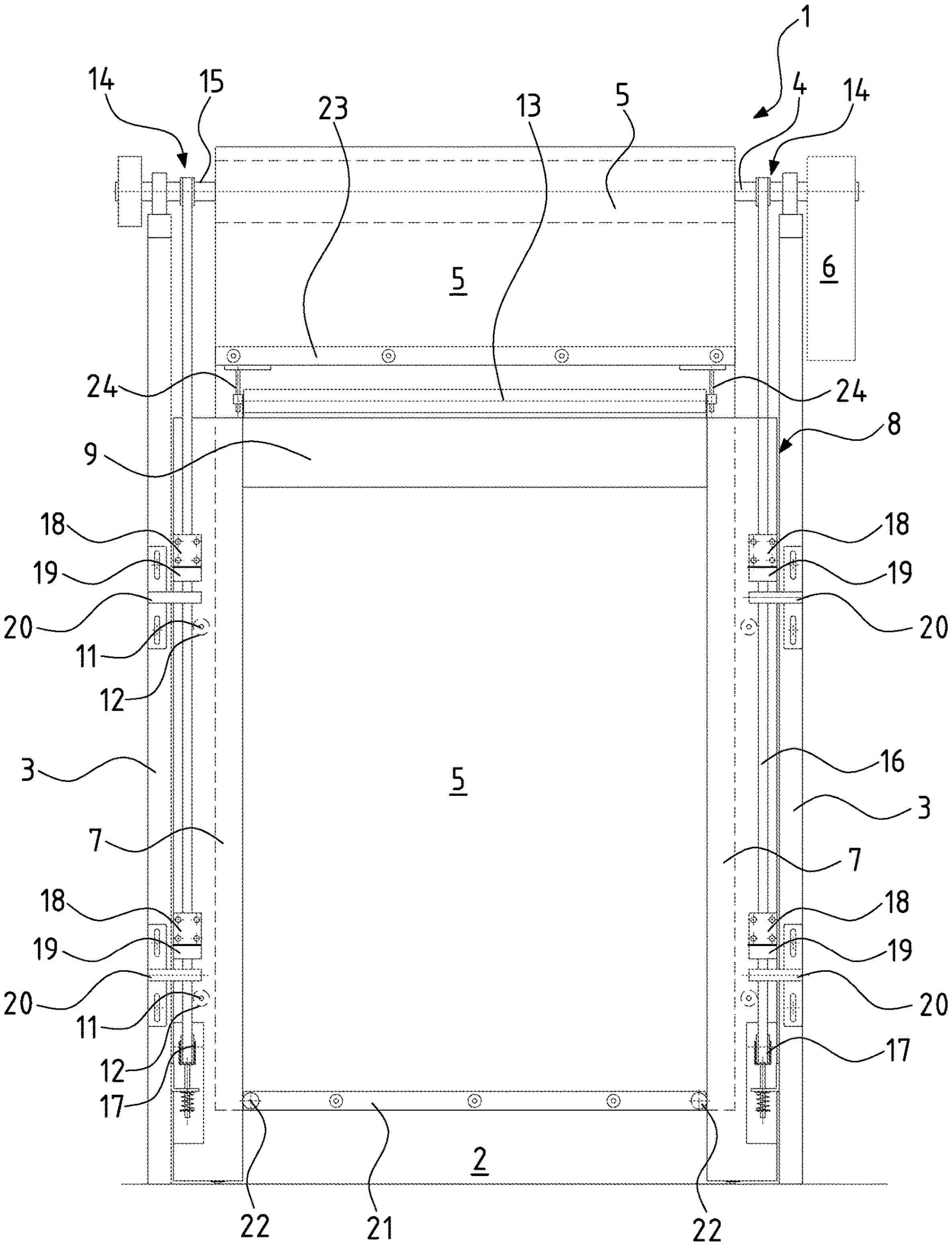
FIG. 1 is a schematic view of a quick-action roll-up door in accordance with the invention from the front.

Referring to the drawings, the quick-action roll-up door 1 illustrated in the figures is intended for purposes of closing a door opening 2 of a cold storage room, which is bounded by a door frame 3, which is fixed in position, and is connected to, or is part of, the cold storage room wall. The door frame 3 is configured in the form of a frame on the front face, and carries a shaft 4 above the door opening 2, which is mounted on the door frame 3 such that it can rotate. The shaft 4 is connected to the upper end of a hanging 5, which forms the door panel 5, and which can be wound onto the shaft 4 by means of the latter. For this purpose, a drive 6 is provided on the door frame, with which the shaft 4 can be driven in the winding-on direction, or in the unwinding direction.

Figure 3:
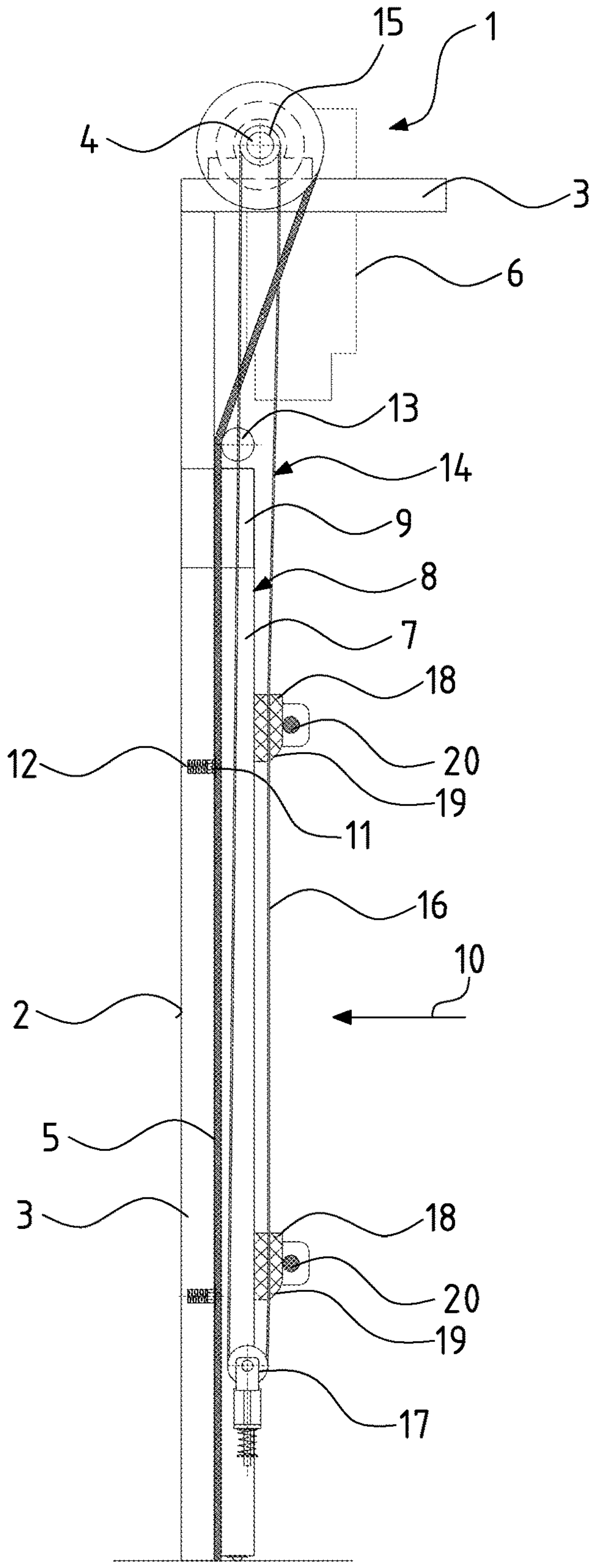
FIG. 3 is a schematic view showing the door in the closed position in an illustration in accordance with FIG. 2.

By means of the drive 6, the shaft 4 can be rotated until the bottom end of the door panel 5 is on the floor, as shown in FIG. 3. In this position (the closed position) the door panel 5 completely closes the door opening 2. Here the door panel 5 is guided laterally between vertical parts of the door frame 3, and pressure application elements 7 arranged vertically parallel to and in front of the latter, which form part of a pressure application frame 8, which in the form of embodiment illustrated is formed by the vertical pressure application elements 7 in the form of beams, and a horizontally arranged upper pressure application beam 9, by means of which the door panel 5 can be pressed against the door frame 3 on both sides (left and right) of the door opening 2, and also on the upper face, to provide a seal.

In the form of embodiment illustrated, the pressure application frame 8 is partially closed, that is to say, it is open at floor level. If necessary, it can also be completely closed, that is to say, over the full periphery, in which case the floor-level cross support is recessed into the floor so that it can be driven over.

To avoid a complex linear guide for the pressure application frame 8, the latter is articulated at floor level, so that the weight of the pressure application frame 8 is supported by the floor, and the forces for opening are applied by the coil springs 12.

The pressure application frame 8 is guided for limited movement on four bolts 11 attached to the door frame 3; that is to say, it can be moved in the direction 10, and in the opposite direction, at right angles to the door panel 5, or to the door opening 2. The bolts 11 are surrounded by coil springs 12, which are pre-loaded and push the pressure application frame 8 away from the door panel 5, so that a clearance is formed for low-friction movement of the door panel 5 for purposes of opening and closing.

Figure 2:
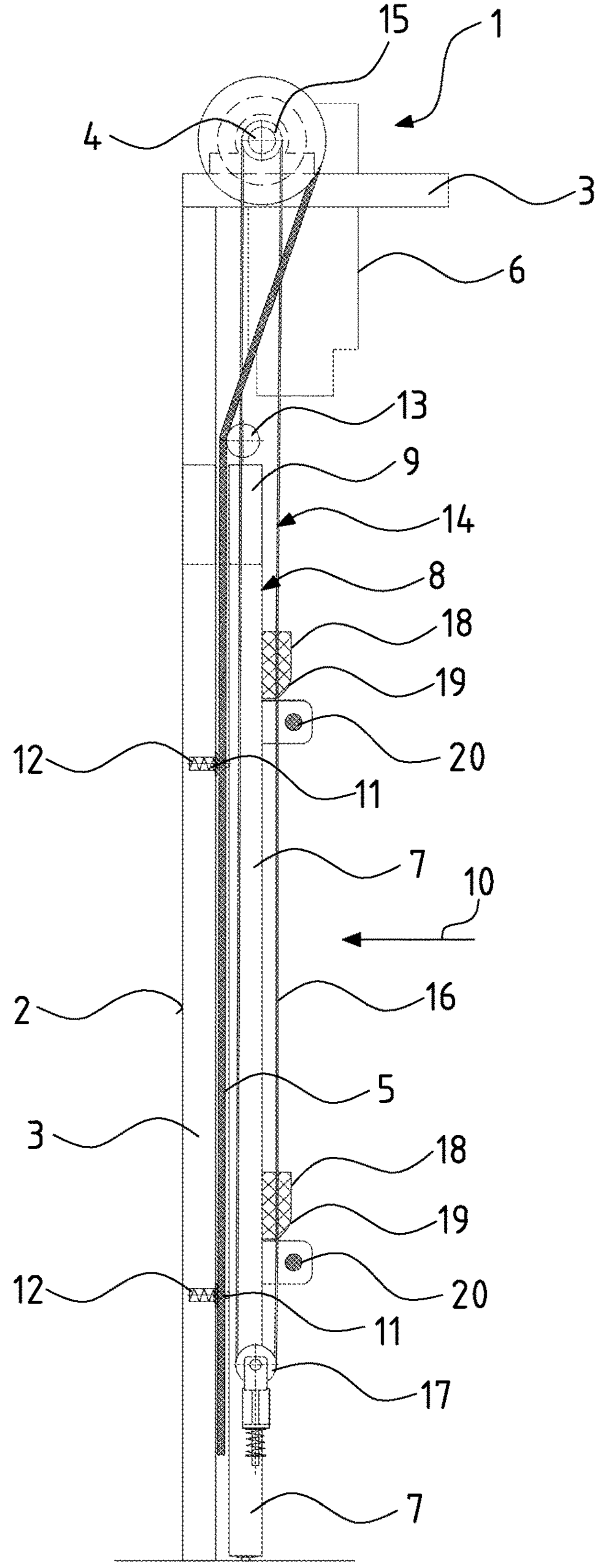
FIG. 2 is a schematic functional view of the quick-action roll-up door in a side view in a first position.

The spacing of the pressure application frame 8 apart from the door frame 3 is supported by a horizontal deflection roller 13 arranged above the door opening 2 and the pressure application beam 9, which is mounted on the pressure application frame 8 such that it can rotate, and which, when the door panel 5 is wound onto the shaft 4, deflects it in such a way, as is clearly visible in FIG. 2 and FIG. 3, that a force is generated to space the pressure application frame 8 apart from the door frame 3. Although for purposes of opening and closing the quick-action door it is necessary to space the pressure application frame 8 apart from the door frame 3 sufficiently so that as little friction as possible occurs in this region, on the other hand a pressure application function is necessary for the sealed closure of the door panel 5 on the door frame, which ensures that in the closed position the hanging 5 closes the door opening 2 with as complete a seal as possible, in order to avoid thermal losses in this region in a cold storage room as far as possible.

For this purpose, the pressure application frame 8 can be pushed in the direction of the door panel 5 in the direction 10 by the drive 6 of the shaft 4 immediately after the door panel 5 has reached the closed position. Two traction drives 14 are provided for this purpose, which in each case have a spur gear 15 seated on the shaft 4, over which a circulating toothed belt 16 runs in front of a pressure application element 7, which belt is tensioned at the lower end by means of a deflection roller 17, which is arranged on the door frame 3 so that it can be vertically moved to a limited extent, and is spring-loaded in the direction of the floor. The traction drives 14 are thus driven and controlled via the drive unit 6, since the spur gears 15 are connected to the shaft 4 in a rotationally fixed manner.

In the present example of embodiment, two controlling bodies 18 are arranged on each toothed belt 16, at a distance from each other. The controlling bodies 18 are of cuboidal configuration, and are chamfered towards the bottom, that is to say, they have a sloping ramp 19, which interacts with a bolt-shaped supporting body 20 arranged parallel to the shaft 4 on the door frame, which supporting body projects laterally into the traction drive 14 in such a way that when the sloping ramp 19 of a controlling body 18 comes into contact with the supporting body 20, the controlling body 18 is pushed in the direction 10 towards the pressure application frame 8. The vertical movement of the controlling body 18 is thus converted by the supporting body 20 into a horizontal movement in the direction 10, whereby the pressure application frame 8, in particular the vertical pressure application elements 7, are force-loaded by the controlling body 18 so as to bear against the door panel 5. This force overcomes the pre-load force of the springs 12 spaced apart from the pressure application frame 8, and presses the pressure application frame 8 with its three sides against the door panel 5, in such a way that the latter bears against the door frame 3 to provide a seal, and thus closes the door opening 2 in a sealed manner.

Since the traction drives 14 are driven via the shaft 4, which also controls the door panel winding, the controlling bodies 18 are always arranged in the same way in relation to the door panel 5 in its closed position. They are adjusted in such a way that immediately after reaching the closed position (FIG. 2) the sloping ramps 19 run onto the supporting bodies 20 and it is thus ensured that after the door is completely closed the door panel 5 bears against the door frame 3 to provide a seal.

Since the door panel 5 is elastically flexible, the unwinding process can be continued by the shaft 4 even after the door panel 5 completely closes the door opening 2. This further movement is used to relieve the deflection roller 13 and to move the controlling bodies 18 between the supporting bodies 20 and the pressure application frame 8. Here the hanging 5 can bulge slightly between the winder and the roller 13.

When opening, the movement takes place in the opposite direction; as soon as the sloping ramps 19 slide over the supporting bodies 20, the pressure application frame 8 is spaced apart from the door frame 3 by the spring force of the coil springs 12 as well as by the deflection force on the deflection roller 13, so that the door panel 5 is guided with some play between the door frame 3 and the pressure application frame 8, but is free to move vertically.

In order to prevent the door panel 5 from tilting, in particular during the closing procedure, and to ensure that the end of the door panel 5 rests evenly on the floor, a crossbeam 21 is attached to the lower end of the door panel 5, at the ends of which guide rollers 22 are arranged so that they can rotate freely and are guided between the door frame 3 and the pressure application frame 8, thus ensuring that the door panel 5 moves up and down in a straight line. The crossbeam 21 with the guide rollers 22 is not illustrated in FIGS. 2, 3 and 5.

For purposes of opening the quick-action roll-up door 1, the shaft 4 is driven in the winding-on direction by the drive 6, which also drives the traction drives 14 via the spur gears 15, which then first disengage the controlling bodies 18 from the supporting bodies 20, so that the pressure application frame 8 is moved against the pressure application direction 10 by the force of the pre-loaded springs, and creates the necessary clearance between the pressure application frame and the door frame 3, which is required for the low-friction raising of the door panel 5.

Figure 4:
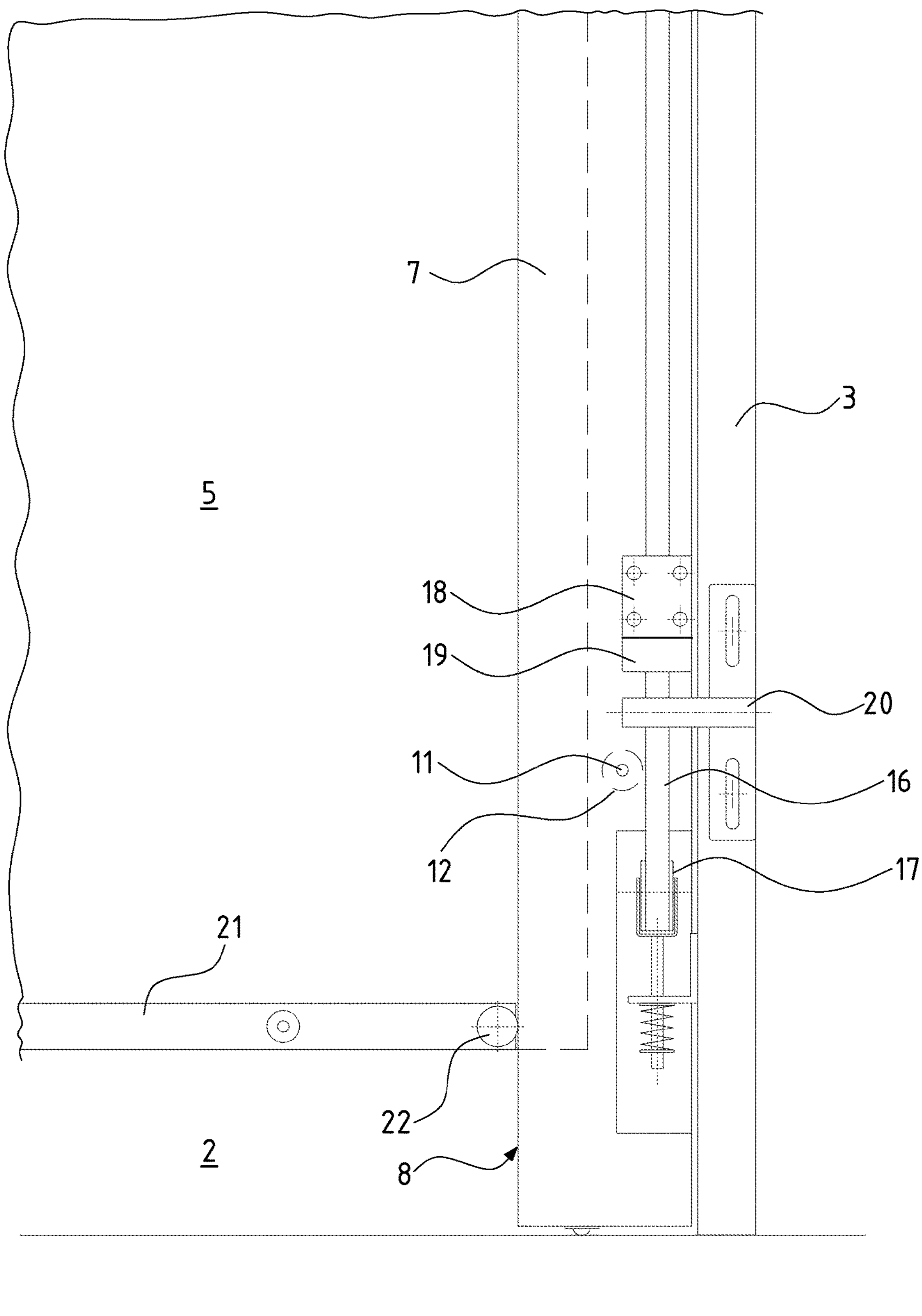
FIG. 4 is a schematic view showing, in an enlarged illustration, the pressure application mechanism from the front.
Figure 5:
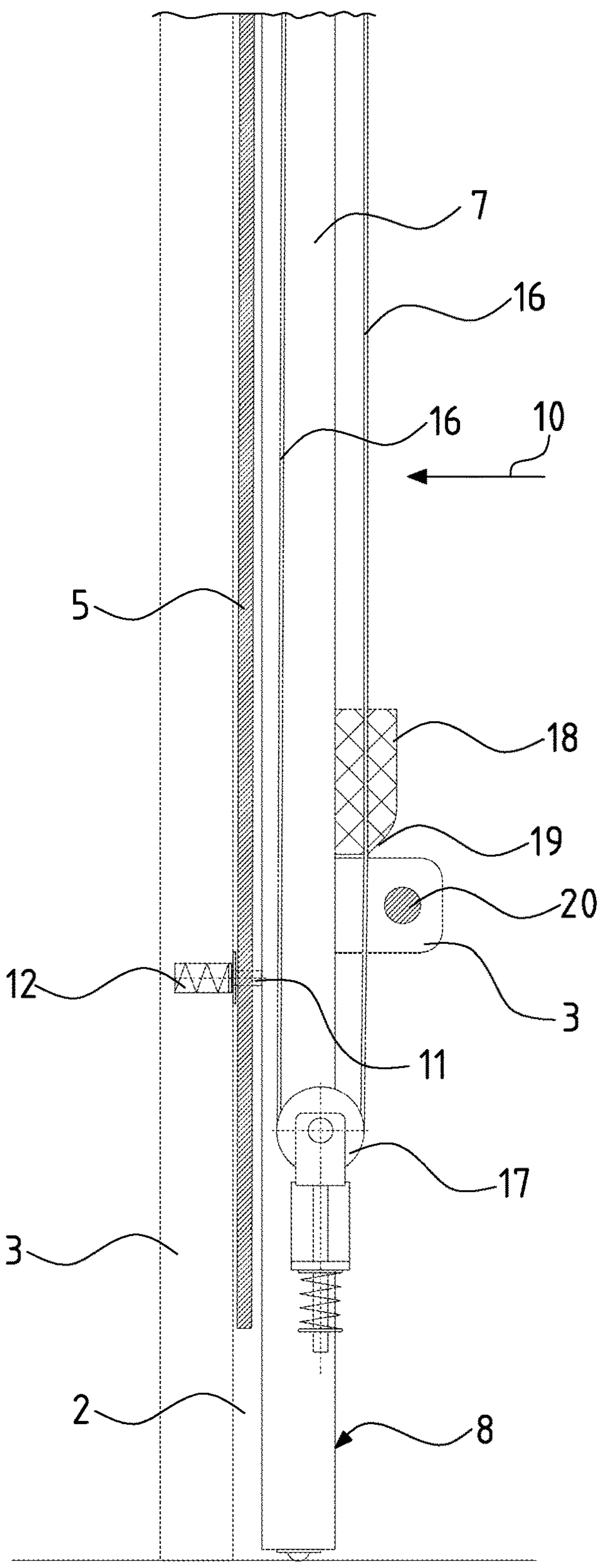
FIG. 5 is a schematic view showing a side cross-section of the pressure application mechanism from FIG. 4.

For correct functioning, therefore, only the position of the controlling bodies 18 on the toothed belts 16 must be stipulated, and/or the spur gears 15 on the shaft 4 must be adjusted to ensure that the door panel 5, when it has completely closed the door opening 2, is pressed against the door frame by the pressure application frame 8 to provide a seal or, conversely, when opening, this seal is first released and the door panel 5 is then pulled upwards and wound onto the shaft 4. FIG. 2 and FIG. 3 illustrate these positions in a greatly simplified and enlarged form. In FIGS. 2, 4 and 5 the door panel 5 is immediately before its closed position, that is to say, before it touches the floor. In this position the controlling body 18 with its sloping ramp 19 comes close to the supporting body 20, wherein after the sloping ramp has passed through, the completely closed position illustrated in FIG. 3 is reached, in which the door opening 2 is completely closed, the door panel 5 rests on the floor, and the pressure application frame 8 presses against the pressure application frame 8 by means of the controlling bodies 18 (only one controlling body is shown in the figures).

In the embodiment variant illustrated, there is not only a crossbeam 21 at the lower end of the door panel 5, but also a crossbeam 23 in an upper region. This crossbeam has two adjustable stops 24 on its lower face, which serve to adjust precisely the closed position of the door panel, namely in such a way that in the closed position the lower crossbeam 21 just rests on the floor. When this closed position is reached, the hanging cannot move any further in the region between the crossbeams 21 and 23 due to the stops 24, which then bear against the upper face of the pressure application frame 8, so that when the hanging is unwound further from the shaft 4, only a bulging of the hanging between the winding and the crossbeam 23 occurs, but otherwise the traction drives 14 are active, which ensure that the pressure application frame 8 is pressed on, and thus that the door panel 5 bears in a planar manner between the pressure application frame 8 and the door frame 3 to provide a seal.

While specific embodiments of the invention have been shown and described in detail to illustrate the application of the principles of the invention, it will be understood that the invention may be embodied otherwise without departing from such principles.

LIST OF REFERENCE SYMBOLS

1 Quick-action roll-up door
2 Door opening
3 Door frame
4 Shaft
5 Hanging/door panel
6 Drive
7 Pressure application elements
8 Pressure application frame
9 Pressure application beam
10 Pressure application direction
11 Bolt
12 Coil springs
13 Deflection roller
14 Traction drive
15 Spur gear
16 Toothed belt
17 Deflection roller
18 Controlling body
19 Sloping ramp
20 Supporting body
21 Crossbeam
22 Guide roller
23 Crossbeam
24 Stops

What is claimed is:

1. A quick-action roll-up door comprising:

a flexible door panel, configured to be wound onto a horizontal shaft in a vertical running direction for purposes of closing a door opening bounded by a door frame;

a winding drive configured to open and close the door;

a pressure application frame configured to subject the door panel, in a door panel closing position, to force, transverse to a planar face of the door panel, in a direction towards the door frame;

a force application means for applying a pressure force to the pressure application frame in the direction of the door frame, when the roll-up door is closed, the force application means comprising a traction drive, which is functionally connected to the winding drive, and which controls movement of the pressure application frame, wherein, the traction drive comprises two circulating traction elements, which traction elements are arranged vertically and in a region of vertical parts of the pressure application frame, which traction elements, in each case, are driven and controlled by a drive gear configured to be seated on the horizontal shaft; and a spring arrangement configured to force the pressure application frame into a position spaced apart from the door panel.

2. A quick-action roll-up door according to claim 1, wherein, the pressure application frame is formed by two vertical pressure application elements.

3. A quick-action roll-up door according to claim 2, wherein the two vertical pressure application elements are configured to be moved independently of each other.

4. A quick-action roll-up door according to claim 1, wherein, the pressure application frame comprises two vertical pressure application elements, which are connected to each other by at least one horizontal element.

5. A quick-action roll-up door according to claim 1, wherein at least one controlling body is attached to each traction element.

6. A quick-action roll-up door according to claim 5, wherein a supporting body, fixed on the door frame, is assigned to each controlling body.

7. A quick-action roll-up door according to claim 5, wherein the at least one controlling body has a wedge-shaped tip or is of wedge-shaped configuration, wherein the tip or the wedge-shaped configuration is directed downwards.

8. A quick-action roll-up door according to claim 1, wherein a controlling body is configured to be moved along a vertical pressure application element, such that a pressure application force is generated upon the controlling body coming between the pressure application element and a supporting body.

9. A quick-action roll-up door according to claim 1, wherein two or more controlling bodies, arranged in a distributed manner over a vertical length, are provided on each traction element.

10. A quick-action roll-up door according to claim 1, wherein each of the traction elements is formed by a chain.

11. A quick-action roll-up door according to claim 1, wherein each of the traction elements is formed by a toothed belt.

12. A quick-action roll-up door according to claim 1, wherein a lower deflection roller is provided for each of the traction elements, which is spring-loaded downwards in a direction of force, and which is mounted on the door frame such that the lower deflection roller is moveable to a limited extent.

13. A quick-action roll-up door according to claim 1, wherein the quick-action roll-up door is configured as a cold storage room door and the pressure application frame, in cooperation with the force application means, is configured to press the door panel to bear between the pressure application frame and the door frame to provide a cold storage room door seal.

14. A quick-action roll-up door comprising:
- a shaft;
- a flexible door panel configured to be wound onto the shaft in a vertical running direction for closing a door opening;
- a pressure application frame;
- a drive; and
- a force application structure configured to apply a force to the pressure application frame with the door panel in a closing position such that the pressure application frame is pressed in a direction transverse to a planar face of the door panel with the door panel in the closing position, the drive being configured to move the door panel to the closing position and to an open position and to drive the force application structure to control movement of the pressure application frame, the force application structure comprising a traction drive including a first endless loop and a second endless loop, each of the first endless loop and the second endless loop being located adjacent to at least a portion of the pressure application frame.

15. A quick-action roll-up door according to claim 14, wherein each of the first endless loop and the second endless loop is connected to the shaft, the drive being configured to actuate the shaft to move the first endless loop and the second endless loop.

16. A quick-action roll-up door according to claim 14, wherein the drive is configured to move the force application structure relative to the pressure application frame.

17. A quick-action roll-up door according to claim 14, wherein at least a portion of the pressure application frame is located between the force application structure and the flexible door panel when the door panel is in the closing position.

18. A quick-action roll-up door comprising:
- a shaft;
- a flexible door panel configured to be wound onto the shaft in a vertical running direction for closing a door opening;
- a pressure application frame;
- a drive; and
- a force application structure configured to apply a force to the pressure application frame with the door panel in a closing position such that the pressure application frame is pressed in a direction transverse to a planar face of the door panel with the door panel in the closing position, the drive being configured to move the door panel to the closing position and to an open position and to move the force application structure, independent of movement of the pressure application frame, to control movement of the pressure application frame, the force application structure comprising a traction drive including a first endless loop and a second endless loop, each of the first endless loop and the second endless loop being located adjacent to at least a portion of the pressure application frame.

19. A quick-action roll-up door according to claim 18, wherein each of the first endless loop and the second endless loop is connected to the shaft, the drive being configured to actuate the shaft to move the first endless loop and the second endless loop.

20. A quick-action roll-up door comprising:
- a flexible door panel, configured to be wound onto a horizontal shaft in a vertical running direction for purposes of closing a door opening bounded by a door frame;
- a winding drive configured to open and close the door;
- a pressure application frame configured to subject the door panel, in a door panel closing position, to force, transverse to a planar face of the door panel, in a direction towards the door frame; and
- a force application means for applying a pressure force to the pressure application frame in the direction of the door frame, when the roll-up door is closed, the force application means comprising a traction drive, which is functionally connected to the winding drive, and which controls movement of the pressure application frame, wherein, the traction drive comprises two circulating traction elements, which traction elements are arranged vertically and in a region of vertical parts of the pressure application frame, which traction elements, in each case, are driven and controlled by a drive gear configured to be seated on the horizontal shaft, wherein at least one controlling body is attached to each traction element, wherein the at least one controlling body has a wedge-shaped tip or is of wedge-shaped configuration, wherein the tip or the wedge-shaped configuration is directed downwards.

21. A quick-action roll-up door comprising:

a flexible door panel, configured to be wound onto a horizontal shaft in a vertical running direction for purposes of closing a door opening bounded by a door frame;

a winding drive configured to open and close the door;

a pressure application frame configured to subject the door panel, in a door panel closing position, to force, transverse to a planar face of the door panel, in a direction towards the door frame; and a force application means for applying a pressure force to the pressure application frame in the direction of the door frame, when the roll-up door is closed, the force application means comprising a traction drive, which is functionally connected to the winding drive, and which controls movement of the pressure application frame, wherein, the traction drive comprises two circulating traction elements, which traction elements are arranged vertically and in a region of vertical parts of the pressure application frame, which traction elements, in each case, are driven and controlled by a drive gear configured to be seated on the horizontal shaft, wherein a controlling body is configured to be moved along a vertical pressure application element, such that a pressure application force is generated upon the controlling body coming between the pressure application element and a supporting body.

22. A quick-action roll-up door according to claim 21, wherein two or more controlling bodies, arranged in a distributed manner over a vertical length, are provided on each traction element.

23. A quick-action roll-up door according to claim 21, wherein each of the traction elements is formed by a chain.

24. A quick-action roll-up door according to claim 21, wherein each of the traction elements is formed by a toothed belt.

25. A quick-action roll-up door according to claim 21, wherein a lower deflection roller is provided for each of the traction elements, which is spring-loaded downwards in a direction of force, and which is mounted on the door frame such that the lower deflection roller is moveable to a limited extent.

* * * * *